Feb. 3, 1942.  A. D. MAST  2,271,897
CORN HUSKING, SHELLING, AND HUSK SEPARATING MACHINE
Filed Jan. 5, 1940  4 Sheets-Sheet 1
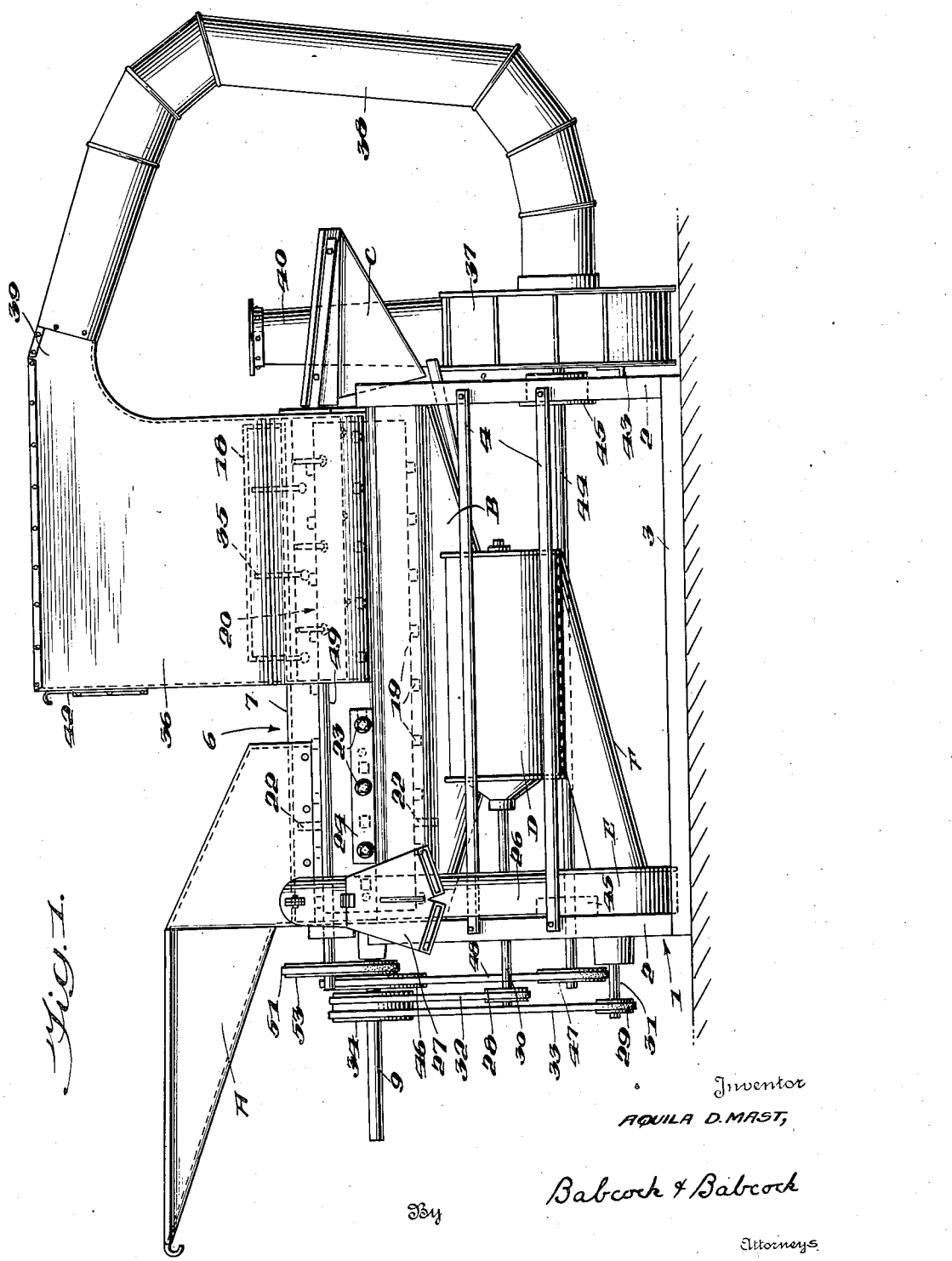
Inventor
AQUILA D. MAST,
By Babcock & Babcock
Attorneys

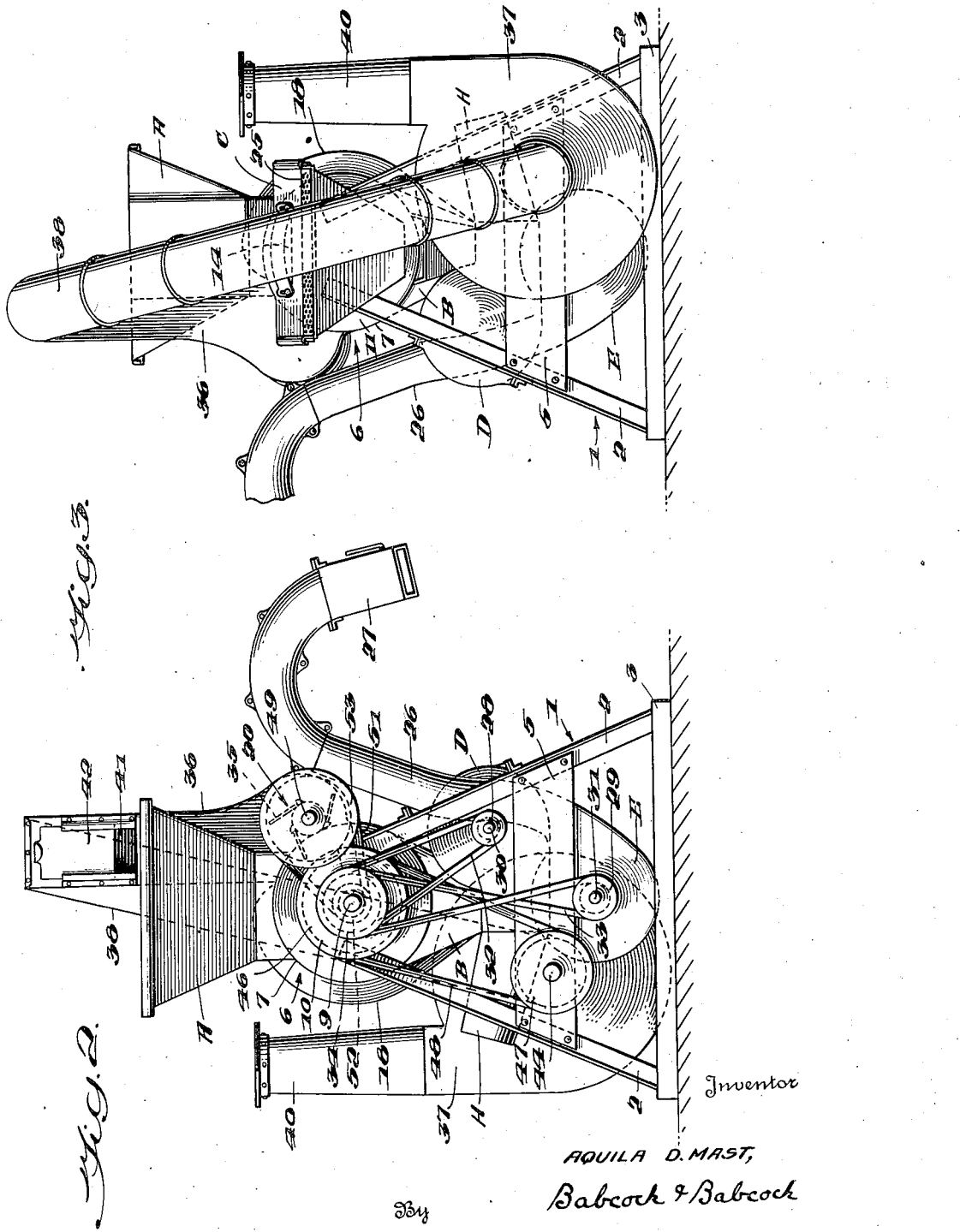

Feb. 3, 1942. A. D. MAST 2,271,897
CORN HUSKING, SHELLING, AND HUSK SEPARATING MACHINE
Filed Jan. 5, 1940 4 Sheets-Sheet 3
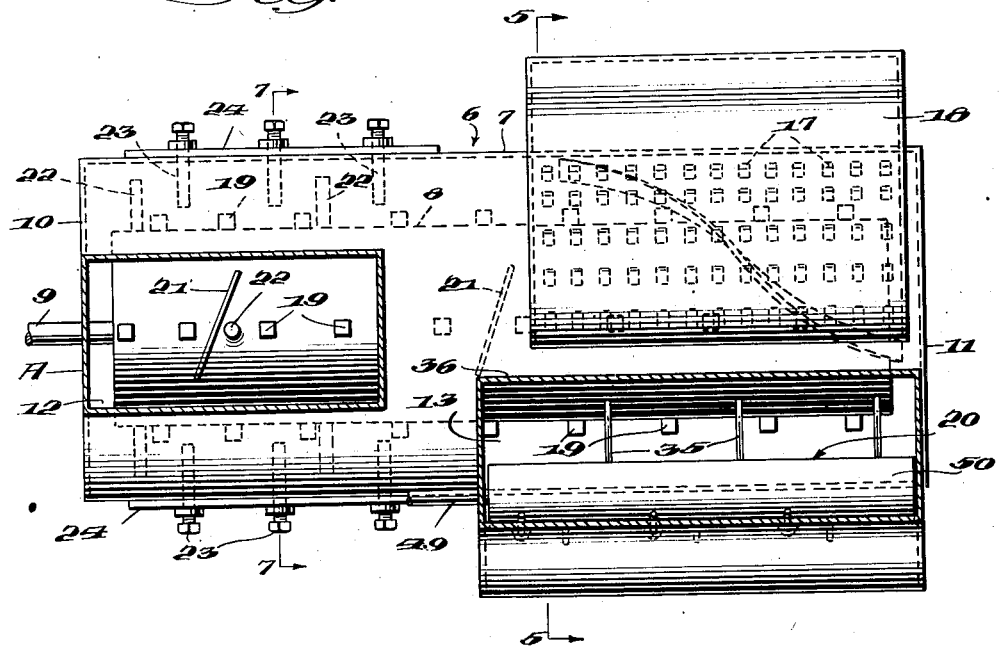
Inventor
AQUILA D. MAST,
Babcock & Babcock
By
Attorneys Feb. 3, 1942.  A. D. MAST  2,271,897
CORN HUSKING, SHELLING, AND HUSK SEPARATING MACHINE
Filed Jan. 5, 1940  4 Sheets-Sheet 4
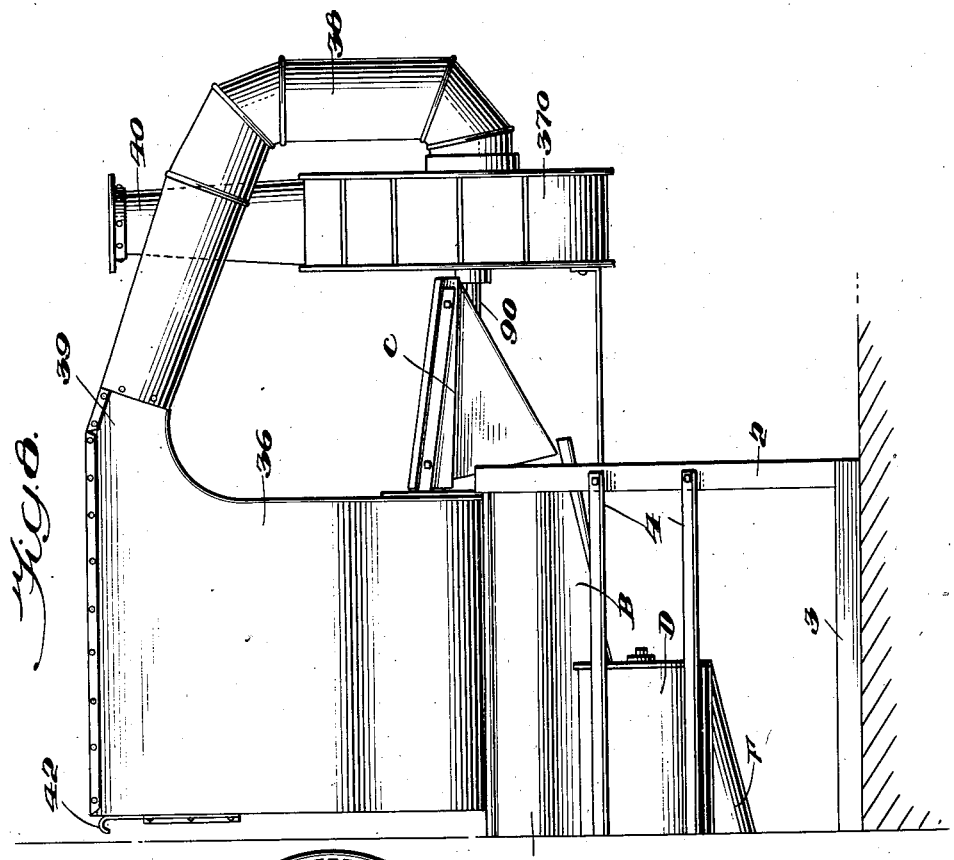
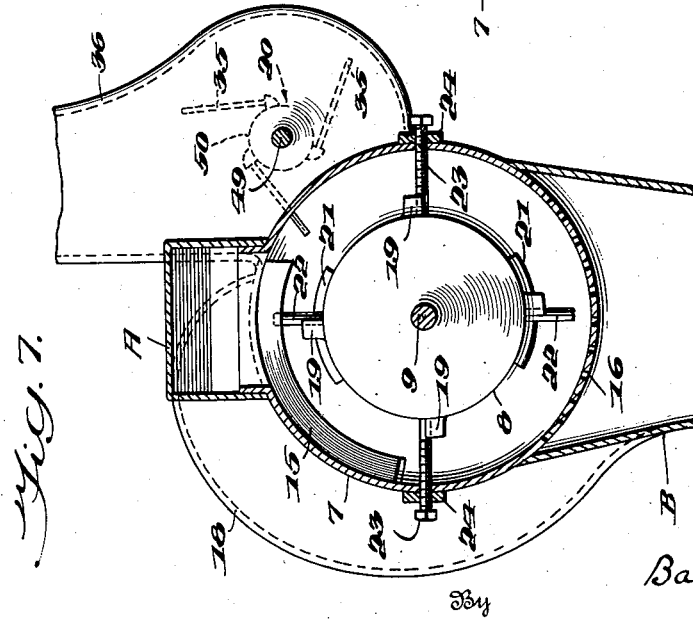
Inventor
AQUILA D. MAST,
By Babcock & Babcock
Attorneys Patented Feb. 3, 1942

2,271,897

UNITED STATES PATENT OFFICE 2,271,897

CORN HUSKING, SHELLING, AND HUSK SEPARATING MACHINE

Aquila D. Mast, Lancaster, Pa., assignor, by mesne assignments, to New Holland Machine Company, New Holland, Pa., a corporation of Pennsylvania Application January 5, 1940, Serial No. 312,592

14 Claims. (Cl. 130—6)

This invention relates to machines for husking and shelling corn and separating the cobs, husks and shelled corn from each other.

Prior known devices for accomplishing the same function have been quite large and heavy and of intricate construction, making their initial cost and upkeep so great as to be beyond reach of the average farmer.

Also such prior devices have required an excessive amount of operating power and have been capable of operating on only a relatively small amount of corn per unit of time, having regard to their size, weight, expenditure of operating power, and expense of upkeep.

Additionally, because of their large size and complicated construction such prior known devices have required a crew of men to operate them and have required a substantial amount of repairs and replacement of parts to keep them in operating condition.

Accordingly, the primary objects of this invention are, to provide a new and highly efficient corn husking, shelling and separating machine of simple construction and operation which may be manufactured, sold and operated at such low cost as to make it available to the average farmer; to provide such a machine which may be of comparatively small size and light weight, and which requires only a comparatively small amount of power for its operation; to provide such a machine which is capable of operating on larger volumes of corn per time unit in comparison to its size and expenditure of power than is now possible with prior known machines for the same purpose; and to provide such a machine which may be operated by one man and easily kept in operating condition.

The foregoing objects and advantages are made possible by the novel application to a corn husking and shelling machine of novel and highly efficient means for separating and removing the corn husks.

In the accompanying drawings:

Figure 1 represents a side elevation of the preferred embodiment of the invention;

Figure 2, an end elevation of the intake end of the machine shown in Figure 1;

Figure 3, an end elevation of the discharge end of the machine;

Figure 4, an enlarged detail top plan view, partly in section, of the husker and sheller and the picker mechanism mounted thereon;

Figure 5, a detail fragmentary section along the line 5—5 of Figure 4, looking in the direction of the arrows;

Figure 6, an enlarged fragmentary radial section through the picker;

Figure 7, a section along the line 7—7 of Figure 4, looking in the direction of the arrows; and Figure 8, a fragmentary side elevation showing the discharge end of a modified form of the invention.

Referring now in detail to the accompanying drawings, the frame or support, designated 1 in its entirety, on which the invention is mounted may be constructed in any suitable manner and preferably consists of the four angle iron or other suitable form of legs 2 attached to a rectangular base 3, and having longitudinally extending chaff blower supporting straps 4 extending from end to end, and plates 5 disposed transversely across each end.

The corn husking and shelling means of the invention, mounted in any suitable manner on said frame 1 and designated 6 in its entirety, consists of a preferably cylindrical substantially axially horizontal jacket or body 7, a husking and shelling cylinder 8 mounted for rotation in said jacket 7, and means for rotating said cylinder 8 preferably comprising the main drive shaft 9 of the invention which, in the preferred embodiment, extends axially through and is rotatably journalled in the end faces 10 and 11 of the jacket 7, the cylinder 8 being keyed or otherwise mounted on said shaft 9 to rotate therewith.

The body or jacket 7 may be constructed of sheet metal or other suitable material and is provided with an upwardly disposed intake aperture 12 in its cylindrical wall adjacent its intake end, an upwardly disposed husk outlet aperture 13 formed in its cylindrical wall adjacent its discharge end, a cob discharge slot 14 formed in the end wall 11 of its discharge end, a helical or spiral guide or baffle 15 disposed at the discharge end of the jacket for guiding the cobs to the cob discharge slot 14, and a series of shelled corn outlet perforations 16 disposed along its bottom.

The intake aperture 12 may be of any suitable shape and of a size large enough to admit ears of corn into the jacket 7 and, if desired, any suitable type of feed hopper A may be disposed over the intake aperture 12 on jacket 7 to facilitate the feeding of corn thereinto.

The husk outlet aperture 13 is preferably in the form of a longitudinally extending rectangular slot of a size large enough to permit the picker 20 to rotate therethrough as hereinafter more fully described.

The cob discharge slot 14 is formed in the upper portion of the jacket end wall 11, as shown in Figure 3, in accordance with usual known practice in corn shelling machines and the guide or baffle 15 preferably extends in a spiral direction from the edge of slot 14 towards the intake end of jacket 7, occupying such a proportion of the jacket length that in operation most of the corn husking operation will have been completed by the time the corn reaches said baffle 15. It will be noted also that although the baffle 15 is not essential its use facilitates the action of the picker mechanism by preventing the passage of cobs thereto while allowing husks carried by cylinder 8 to be rotated past said baffle into engagement with said picker 20 to be removed thereby.

The perforations 16 in the bottom portion of jacket 7 are arranged in the usual manner employed in corn shelling mechanism, being distributed preferably throughout the entire length of the jacket bottom. Since it is desired to make the preferred embodiment of the invention as compact as possible, the jacket 7 is made of comparatively short length and, in order to make such a short jacket 7 function as efficiently as a longer one, said jacket 7 may be provided in its upper portion adjacent its discharge end with additional shelled corn discharge or outlet perforations 17 to secure a complete separation of the shelled corn from the cobs and husks.

It is desirable to provide a suitable preferably funnel shaped shelled corn hopper B which may be attached to the perforated bottom portion of jacket 7 in accordance with usual practice to receive shelled corn through the bottom discharge perforations 16 thereof, and where the additional upper discharge perforations 17 are used said hopper B may be provided with an extension or hood or manifold 18 spaced away from and enclosing the upper discharge end of jacket 1 containing said perforations 17 so as to direct shelled corn discharged therethrough into said hopper B.

The hereinbefore referred to husking and shelling cylinder 8 mounted on shaft 9 for rotation in jacket 7 is preferably disposed in coaxial relation in said jacket 7 and has its cylindrical surface radially inwardly spaced from the cylindrical jacket walls. Disposed on the surface of cylinder 8 throughout the length thereof is a series of radially projecting husking and shelling lugs 19, such as are commonly used in corn shelling machines, preferably arranged spirally on said cylinder 8 to during rotation thereof urge the corn towards the discharge end of the husker and sheller 6.

In addition to providing such spiral formation of lugs 19 for the purpose stated it may also be desirable to provide a plurality of spiral or helical feeder vanes 21 fixedly attached in any suitable manner on cylinder 8 to supplement the action of the lugs 19 in urging the corn towards the discharge end of the jacket 7.

In order to expedite the corn husking operation it is desirable to provide the cylinder 8 and jacket 7 adjacent the intake end of jacket 7 with coacting radially extending husking spikes 22 and 23 respectively. The spikes 23 of the jacket are arranged in two diametrically opposed horizontal rows, preferably of three each, and the spikes 22 of the cylinder 8 are preferably so positioned longitudinally on cylinder 8 as to during rotation of said cylinder pass between the spikes 23 of the jacket 7. Said spikes 22 and 23 may be mounted in any suitable known way and if desired may be made relatively radially adjustable, as shown in Figure 7, wherein the spikes 23 consist of bolts screwed through the sides of jacket 8 so as to be adjustable by rotation to any desired radial position in said jacket. Preferably the sides of said jacket 8 in which the spikes 23 are disposed are reinforced by a pair of oppositely disposed reinforcing plates 24 spot welded or otherwise fixedly attached to said jacket, the spikes being disposed both through said plates 24 and the jacket sides.

In order to increase the ease of handling and efficiency of the hereinbefore described husker and sheller 6 it is desirable to connect a number of usual well known accessories in operative relation thereto, as for instance the usual cob shaker C disposed at the discharge end of said husker and sheller 6 to salvage any shelled corn that may be discharged with the cobs through the cob slot 14; the usual chaff blower D disposed at the bottom of shelled corn hopper B and supported by the frame members 4, to clean out the dust and fragments of cobs and husks or other foreign matter from the shelled corn; and any usual form of bagger attachment E connected by a chute F to receive shelled corn from the bottom of hopper B after said corn has been cleaned by the action of chaff blower D.

The cob shaker C shown in the drawings is of the usual form having a vibrating perforated plate 25 disposed to receive cobs and some shelled corn through the cob slot 14 of jacket 7, and the shelled corn hopper B preferably extends beneath said shaker C to receive shelled corn falling through said perforated shaker plate 25.

The chaff blower D shown in the drawings represents any usual form of centrifugal or other type of blower disposed to in operation blow a strong current of air in a transverse horizontal direction through the bottom of hopper B to carry away any foreign matter out the side of said hopper B through a suitable spout H mounted thereon, while the heavier shelled corn particles or grains fall vertically down through said transverse air current into the chute F connected to the bottom of hopper B and are carried by gravity down the sloping bottom of said chute F to be received in the bagger E.

The bagger E shown in the drawings is of the usual centrifugal fan type adapted to elevate the shelled corn upwardly through a conduit 26 to be discharged through the delivery spouts 27 thereof.

Both the chaff blower D and bagger E may have pulleys 28 and 29 keyed or otherwise fixedly mounted on their respective fan or blower shafts 30 and 31 to receive rotary motion through belts 32 and 33 respectively from a pulley or wheel 34 mounted on main drive shaft 9 for rotation therewith. Or, if desired, any other suitable driving means for said chaff blower D and bagger E may be employed.

The novel husk separating and removing means of my invention, which is combined in novel fashion with the hereinbefore described husker and sheller 6 to remove the corn husks therefrom, comprises means for producing a strong air current just outside of and in a direction away from the husk discharge aperture or slot 13 of the jacket 7 and a novel rotary picker or picker mechanism, generally designated 20, having picker arms 35 extending through said husk discharge aperture 13 into near engagement with rotary cylinder 8 to during rotation remove husks from said cylinder 8, rotate them through the husk discharge aperture 13 and release them on the other side thereof outside of jacket 8 to be carried away by said air current.

In the preferred embodiment of the invention the desired air current is produced by means consisting of a sheet metal or other suitable material picker casing or hood 36 attached to jacket 7 in air tight fashion over the husk discharge aperture 13 in any suitable known manner, and a centrifugal husk blower fan 37 having its intake port connected by a pipe or conduit 38 to the upper portion of said casing, as at 39 to in operation produce a strong outwardly flowing air current through husk discharge aperture 13, picker casing 36, conduit 38, and fan 37 to be discharged through any suitable discharge spout 40 connected to the discharge port of said fan 37.

The picker casing or hood 36 preferably extends upwardly for a substantial distance above jacket 7 and is preferably provided at some point with means for varying the upward flow of air from the husk discharge aperture 13 of jacket 7 to suit varying conditions of the corn being operated upon. For instance when the corn husks are heavy as from dampness a stronger upward air flow will be required to convey them upward to conduit 38 than when they are dry and comparatively light. To this end the picker casing 36 may be provided in its upper portion, preferably opposite its discharge port or spout 39, with an air intake aperture or opening 41 having disposed over it a preferably vertically slidable gate or closure plate 42 adjustable to various positions to permit varying amounts of air to be sucked thereinto by the action of fan 37, decreasing the upward flow of air from aperture 13 as the size of the opening 41 is increased to allow the inflow of a larger proportion of the air to fan 37 therethrough, and increasing the air flow through husk discharge aperture 13 as plate 42 is moved towards closed position.

The pipe or conduit 38 connecting the picker casing or hood 36 with the fan 37 may be of any type obvious to those skilled in the art, as may also the fan 37.

I prefer to mount the fan 37 on the frame 1 by suitable brackets or other means 43 attached to the frame legs 2 at the discharge end of the machine, the fan shaft 44 being rotatably journalled in bearings 45 carried by the plates 5 disposed at opposite ends of frame 1 for this purpose.

Operating power for rotating fan 37 may be conveyed to shaft 44 by any usual means, and to this end I provide pulleys 46 and 47 respectively mounted on drive shaft 9 and fan shaft 44 for rotation therewith, and a belt 48 passing around said respective pulleys to convey rotary motion from said drive shaft 9 to fan shaft 44.

The preferred embodiment of picker 20 shown in the drawings comprises a picker shaft 49 preferably rotatably journalled through picker casing or hood 36, a picker cylinder or drum 50 mounted on the picker shaft 49 for rotation therewith, and a plurality of picker arms 35 carried by said drum 50.

The aforementioned picker shaft 49 extends substantially parallel to drive shaft 9 and is journalled for rotation through the ends of the picker hood 36, said picker shaft 49 preferably being rotated by the main drive shaft 9 through the medium of a belt 51 passing around pulleys 52 and 53 respectively keyed on said shafts 9 and 49.

The picker drum 50 is preferably in the form of a cylinder formed with diametrically extending members 54 having integral medial journal portions 55 to receive the picker shaft 49, relative rotation between said drum 50 and shaft 49 being prevented by means of a set screw 56 extending radially through the journal portion 55 of each said member 54 into tight frictional engagement with shaft 49. Access may be had to set screw 56 through a hole 57 formed in the drum surface for this purpose.

The preferred form of picker arms 35 shown in the drawings are of resilient steel wire or other suitable preferably resilient material and are of such length that in operative assembled condition on drum 50 they will rotate through the husk discharge aperture 13 of jacket 7 into near engagement with the lugs 19 of rotary cylinder 8 to remove the corn husks therefrom, carry them up through the husk discharge aperture 13, and release them in the picker casing 36 to be carried away by the air current flowing therethrough.

The preferred mounting means for picker arms 35 on drum 50 consist of a series of preferably tangentially disposed sockets 58 formed in the drum 50, in which the ends of the respective picker arms 35 are inserted and retained in place by set screws 59 threaded through the side walls of each socket 58 into tight engagement with the picker arms 35 contained therein, all as clearly shown in Figure 6.

In addition to providing convenient mounting means for the arms 35 the drum 50 when utilized as part of the picker structure serves the further important purpose of providing a surface which in operation prevents the husks from approaching too close to the axis of rotation of the picker where there might not be sufficient centrifugal force to throw them clear after they have passed through husk discharge aperture 13. It is to be noted however that centrifugal force alone need not be relied upon to throw the husks clear of said picker 20 but that the centrifugal force is supplemented by the strong upward current of air flowing through the casing or hood 36.

Also it will further help in maintaining picker arms 35 clear if said arms 35 are inclined in a substantially tangential direction away from the direction of rotation of the picker 20, as clearly shown in Figure 6, whereby the upward blast of air flowing through husk discharge aperture 13 in the preferred embodiment of the invention may have a full lengthwise sweep of each picker arm 35 just as it starts to rotate downwardly. However this feature is not essential to the successful operation of my invention nor is it essential that the picker drum 50 of the preferred embodiment be included in the picker construction.

In the operation of the invention the picker may be disposed for rotation in either direction, independent of or notwithstanding the direction of the cylinder 8, and in either direction of rotation will serve efficiently its hereinbefore described function.

In the operation of the hereinbefore described embodiment of the complete machine, the main drive shaft may be rotated by any usual known means to cause rotation of all the shafts driven by said shaft 9.

The corn may be fed into the jacket 7 through feed hopper A and the corn husks are removed by the joint action of the spikes 22 and 23 and lugs 19, the corn cobs and husks meanwhile being urged toward the discharge end of the jacket 7 by the action of the vanes 21 and spirally arranged lugs 19.

The lugs 19 of course serve to shell the corn which falls or is thrown through the perforations 16 and 17 into the hopper B to be cleaned by the action of chaff blower D and then slide through chute F into the bagger E.

The cobs are directed through the cob slot 14 by the action of baffle 15 onto the cob shaker C, and any loose grains of corn which may be carried therewith sift through the perforated shaker plate 25 into hopper B.

The husks, as hereinbefore described, are removed from the cylinder 8 and delivered through the husk outlet aperture 13 of jacket 7 into the picker casing 36 to be sucked therethrough by fan 37 and delivered or discharged through the fan spout 40.

In the modified form of the invention shown in Figure 8 of the drawings, the construction and operation are the same as in the preferred embodiment hereinbefore described, except that the husk blower fan 370 of the modified form is mounted directly on the main drive shaft 90 to be rotated thereby. The shaft 90 is accordingly increased somewhat in length, as shown, and the independent fan shaft 44 of the preferred embodiment is of course eliminated, making for a somewhat simpler construction.

The advantages of the preferred form of the invention are that the speed of fan 37 thereof may differ from the speed of rotation of the main drive shaft 9 and may be varied from time to time if desired by merely changing the relative diameters of rotary motion transmitting pulleys 46 and 47 by the substitution of other pulleys therefor or addition of other varying diameter pulleys on said shafts 9 and 44, in accordance with usual well known practice, whereas in the modified form the fan speed is the same as that of the main drive shaft 90, although the construction is somewhat simplified.

I claim:

1. A corn husking, shelling, and husk separating machine comprising a cylindrical horizontally extending jacket formed in its upper portion adjacent its discharge end with a longitudinally extending rectangular husk discharge aperture, an axially disposed drive shaft journalled for rotation through said jacket, means for rotating said shaft, and a husking and shelling cylinder mounted on said shaft for rotation therewith, in combination with husk separating and removing means comprising a picker casing mounted over the husk discharge aperture of said jacket, a centrifugal fan, a conduit connecting the upper portion of said casing to the intake port of said fan, whereby operation of said fan produces a strong upward current of air through said picker casing, a picker shaft journalled for rotation through said casing parallel to said drive shaft, means for transmitting rotary motion from said drive shaft to said picker shaft, a picker arm mounted on said picker shaft for rotation therewith in said casing, and tangentially extending picker arms carried by said drum and disposed for rotation through said husk discharge aperture into near engagement with said cylinder to in operation engage and remove corn husks from said cylinder, carry them through said discharge aperture and release them in said picker casing to be carried away by said air current.

2. A corn husking, shelling, and husk separating machine comprising a cylindrical horizontally extending jacket formed in its upper portion adjacent its discharge end with a husk discharge aperture, an axially disposed drive shaft journalled for rotation through said jacket, and a husking and shelling cylinder mounted on said shaft for rotation therewith, in combination with husk separating and removing means comprising a picker casing mounted over the husk discharge aperture of said jacket, a fan, a conduit connecting the upper portion of said casing to the intake port of said fan whereby operation of said fan produces a strong upward current of air through said picker casing, a picker shaft journalled for rotation through said casing parallel to said drive shaft, means for transmitting rotary motion from said drive shaft to said picker shaft, a picker drum mounted on said picker shaft for rotation therewith in said casing, and tangentially extending picker arms carried by said drum and disposed for rotation through said husk discharge aperture into near engagement with said cylinder to in operation engage and remove corn husks from said cylinder, carry them through said discharge aperture and release them in said picker casing to be carried away by said air current.

3. A corn husking, shelling, and husk separating machine comprising a cylindrical horizontally extending jacket formed with an upwardly disposed husk discharge aperture, and a coaxially disposed husking and shelling cylinder mounted for rotation in said jacket, in combination with husk separating and removing means comprising a picker casing mounted over the husk discharge aperture of said jacket, a fan, a conduit connecting the upper portion of said casing to the intake port of said fan whereby operation of said fan produces a strong upward current of air through said picker casing, and a husk picker comprising a cylindrical picker drum mounted in said casing for rotation about an axis parallel to the axis of said husking and shelling cylinder, and a plurality of resilient picker arms carried by said drum, said arms being inclined in a tangential direction away from the direction of rotation of said drum, and the position of said husk picker being such that in operation the picker arms thereof rotate into and out of the jacket through said husk discharge aperture to remove corn husks from said cylinder, carry them through said discharge aperture and release them in said casing to be carried away by said air current.

4. A corn husking, shelling, and husk separating machine comprising a horizontally extending jacket formed with an upwardly disposed husk discharge aperture, and a husking and shelling cylinder mounted for rotation in said jacket, in combination with husk separating and removing means comprising a casing mounted over the husk discharge aperture of said jacket, a fan disposed to produce a strong upward current of air through said casing, and a husk picker comprising a cylindrical picker drum mounted in said casing for rotation about an axis parallel to the axis of said husking and shelling cylinder, and a plurality of resilient picker arms carried by said drum, said arms being inclined in a tangential direction away from the direction of rotation of said drum, and the position of said husk picker being such that in operation the picker arms thereof rotate into and out of the jacket through said husk discharge aperture to remove corn husks from said cylinder, carry them through said discharge aperture and release them in said casing to be carried away by said air current.

5. A corn husking, shelling, and husk separating machine comprising a jacket formed with an upwardly disposed husk discharge aperture, and a husking and shelling cylinder mounted for rotation in said jacket, in combination with husk separating and removing means comprising a casing mounted over the husk discharge aperture of said jacket, means for producing a strong current of air in said casing in a direction away from said aperture and cylinder, and a husk picker comprising a picker drum mounted for rotation about a longitudinal axis in said casing, and a plurality of resilient picker arms carried by said drum, said arms being inclined in a tangential direction away from the direction of rotation of said drum, and the position of said husk picker being such that in operation the picker arms thereof rotate into and out of the jacket through said husk discharge aperture to remove corn husks from said cylinder, carry them through said discharge aperture and release them in said casing.

6. A corn husking, shelling, and husk separating machine comprising a jacket formed with an upwardly disposed husk discharge aperture, and a husking and shelling cylinder mounted for rotation in said jacket, in combination with husk separating and removing means comprising means for producing a strong current of air just outside of and in a direction away from said aperture, and a husk picker comprising a picker drum mounted for rotation in said aperture about an axis substantially parallel to the axis of said husking and shelling cylinder, and a plurality of raidally projecting picker arms carried by said drum, the position of said husk picker being such that in operation the picker arms thereof rotate into and out of said aperture in near engagement with said cylinder to remove corn husks from said cylinder and release said husks outside of said aperture to be carried away by said air current.

7. A corn husking, shelling, and husk separating machine comprising a jacket formed with a discharge aperture, and a husking and shelling cylinder mounted for rotation in said jacket, in combination with means for producing a strong outwardly flowing current of air through said aperture, a husk picker comprising a drum mounted for rotation in said aperture, and a plurality of projecting picker arms carried by said drum to in operation rotate into and out of said aperture in near engagement with said cylinder, and a radially inwardly extending helical baffle mounted in said jacket at one side of said aperture and so spaced radially from said cylinder as to allow husks to be rotated on said cylinder into engagement with said picker while preventing the passage of cobs thereto.

8. A corn husking, shelling, and husk separating machine comprising a jacket formed with a discharge aperture, and a husking and shelling cylinder mounted for rotation in said jacket, in combination with a husk picker mounted for rotation in said aperture and having a plurality of projecting picker arms disposed for rotation through said aperture into near engagement with said cylinder, and a radially inwardly extending helical baffle mounted in said jacket at one side of said aperture and so spaced radially from said cylinder as to allow husks to be rotated on said cylinder into engagement with said picker while preventing the passage of cobs thereto.

9. A corn husking, shelling, and husk separating machine comprising a jacket formed with a discharge aperture, and a husking and shelling cylinder mounted for rotation in said jacket, in combination with a husk picker comprising a plurality of projecting picker arms mounted in said aperture for rotation in near engagement with said cylinder, and a radially inwardly extending baffle mounted in said jacket at one side of said aperture and so spaced radially from said cylinder as to permit the passage of husks carried by said cylinder into engagement with said picker while preventing the passage of cobs thereto.

10. A corn husking, shelling, and husk separating machine comprising a cylindrical jacket formed with an upwardly disposed husk discharge aperture in its cylindrical wall and a cob discharge slot in its end wall, a husking and shelling cylinder disposed for rotation in said jacket and spaced radially from the cylindrical walls thereof, a husk picker mounted for rotation in said aperture and having a plurality of projecting picker arms disposed for rotation through said aperture to remove the husks from said cylinder, in combination with a radially inwardly extending helical baffle mounted in said jacket at one side of the husk outlet aperture thereof and so spaced radially from said cylinder as to allow husks to be rotated on said cylinder into engagement with said picker, while directing cobs to said cob discharge slot and preventing their passage to said picker.

11. A corn husking, shelling, and husk separating machine comprising a cylindrical jacket formed with a husk discharge aperture and a cob discharge slot, a husking and shelling cylinder disposed for rotation in said jacket and spaced radially from the cylindrical walls thereof, a husk picker comprising a plurality of projecting picker arms disposed for rotation through said husk discharge aperture to remove the husks from said cylinder, and a radially inwardly extending baffle mounted in said jacket at one side of the husk outlet aperture and so spaced radially from said cylinder as to allow husks to be carried by said cylinder into engagement with said picker, while directing cobs to said cob discharge slot and preventing their passage to said picker.

12. A corn husking, shelling, and husk separating machine comprising a cylindrical jacket formed with a husk discharge aperture, a husking and shelling cylinder disposed for rotation in said jacket and spaced radially away from the walls thereof, a husk picker comprising a projecting picker arm disposed for rotation through said husk discharge aperture to remove the husks from said cylinder, and a radially inwardly extending baffle mounted in said jacket at one side of the husk outlet aperture and so spaced radially from said cylinder as to allow husks to be carried by said cylinder into engagement with said picker while preventing the passage of cobs thereto.

13. A corn husking, shelling, and husk separating machine comprising a rotary husking and shelling cylinder, a rotary picker mounted adjacent said cylinder to remove and carry away the husks therefrom, and means for producing a strong current of air past said picker in a direction away from said cylinder to carry away the husks from said picker, said picker comprising a cylindrical drum mounted for rotation about an axis parallel to the cylinder axis, and a plurality of picker arms mounted on said drum, said arms being disposed in a tangential direction away from the direction of rotation of said drum so that at some point during the rotation of said drum said air current will get a full lengthwise sweep along each of said arms to facilitate the removal of husks therefrom.

14. A corn husking, shelling, and husk separating machine comprising a rotary husking and shelling cylinder, a rotary picker comprising a plurality of projecting picker arms mounted adjacent said cylinder for rotation about an axis parallel to the cylinder axis to remove and carry away the husks therefrom, and means for producing a strong current of air past said picker in a direction away from said cylinder to carry away the husks from said picker.

AQUILA D. MAST.